(12) United States Patent
Clawson et al.

(10) Patent No.: US 7,145,744 B1
(45) Date of Patent: Dec. 5, 2006

(54) REDUCING SPIRAL WRITE TIME AND CLOCK TRACK DRIFT WHILE WRITING SPIRAL REFERENCE PATTERNS TO A DISK OF A DISK DRIVE

(75) Inventors: William W. Clawson, Fremont, CA (US); Tomas D. Hugunin, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/196,076

(22) Filed: Aug. 3, 2005

(51) Int. Cl.
*G11B 21/02* (2006.01)
*G11B 5/09* (2006.01)

(52) U.S. Cl. .......................... 360/75; 360/51
(58) Field of Classification Search .............. None
See application file for complete search history.

(56) References Cited

U.S. PATENT DOCUMENTS 5,668,679 A    9/1997 Swearingen et al.
6,992,848 B1 *  1/2006 Agarwal et al. .............. 360/75
7,088,533 B1 *  8/2006 Shepherd et al. ............. 360/51

\* cited by examiner

*Primary Examiner*—Hoa Thi Nguyen
*Assistant Examiner*—Mitchell Slavitt
(74) *Attorney, Agent, or Firm*—Jonathan E. Prejean, Esq.; Blakely, Sokoloff, Taylor & Zafman (57) ABSTRACT

Disclosed is a method for reducing spiral write time and clock reference drift while writing spiral reference patterns on a disk of a disk drive. The method includes: controlling a radial location of a head for writing a first band of tracks near one of an outer diameter (OD) circumference of the disk or an inner diameter (ID) circumference of the disk and for writing a second band of tracks near the other of the OD circumference of the disk or the ID circumference of the disk, respectively, wherein a substantial majority of the tracks each include a plurality of servo sectors including a track number and a sync mark; measuring a distance between first and second reference center positions of reference center tracks of the first and second bands of tracks; and writing a spiral reference pattern therebetween.

30 Claims, 8 Drawing Sheets

REDUCING SPIRAL WRITE TIME AND CLOCK TRACK DRIFT WHILE WRITING SPIRAL REFERENCE PATTERNS TO A DISK OF A DISK DRIVE

FIELD OF THE INVENTION

The present invention relates to disk drives for computer systems. More particularly, the present invention relates to a method and system for reducing spiral write time and clock track drift while writing spiral reference patterns to a disk of a disk drive.

BACKGROUND

Figure 1:
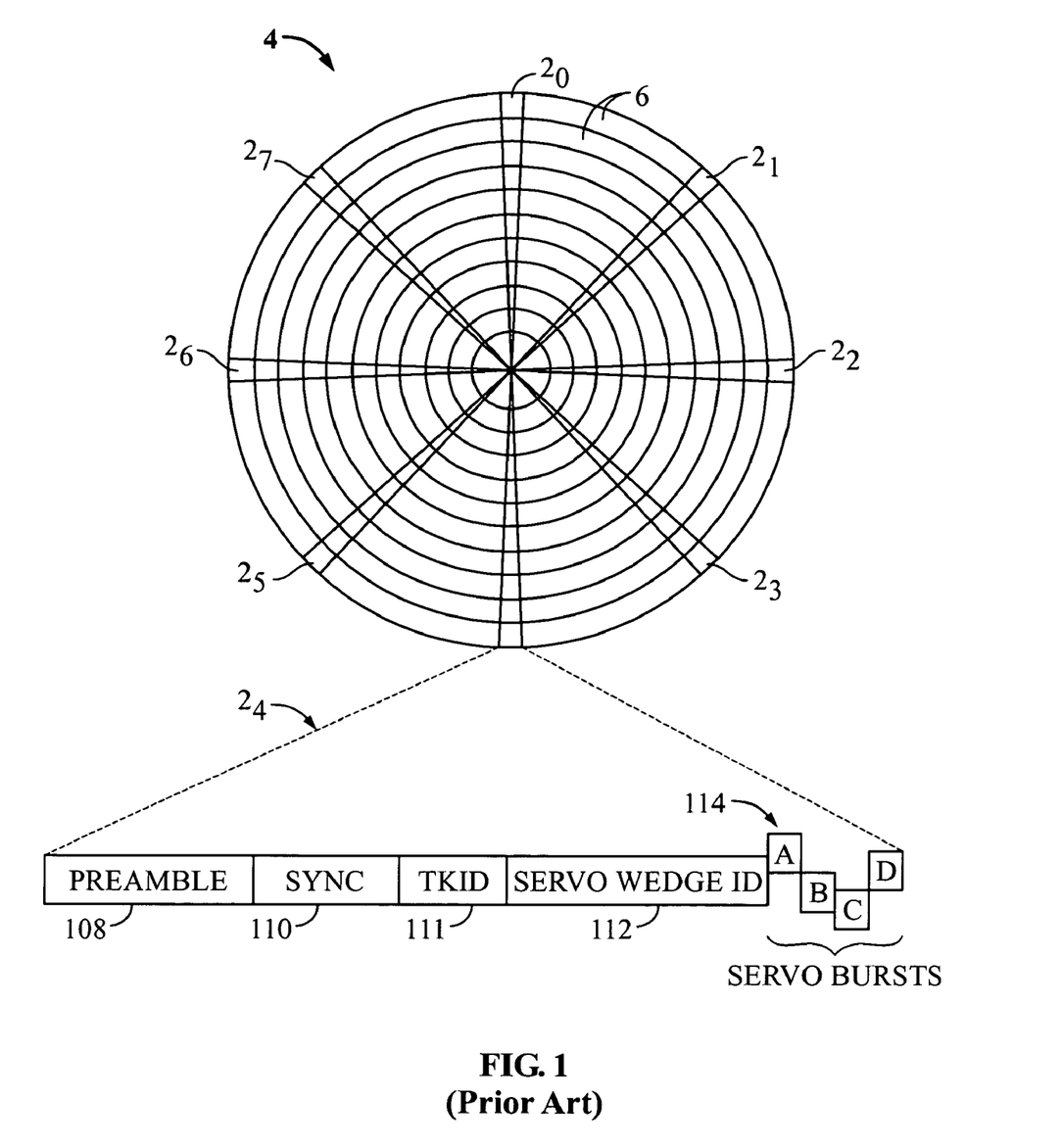
FIG. 1 shows a prior art format for a disk including a plurality of servo sectors, which define a plurality of radially spaced, concentric data tracks.

When manufacturing a disk drive, servo sectors $2_0$–$2_7$ are written to a disk 4 which define a plurality of radially-spaced, concentric data tracks 6 as shown in the prior art disk format of FIG. 1. Each servo sector (e.g., servo sector $2_4$) comprises a preamble 108 for synchronizing gain control and timing recovery, a sync mark 110 for synchronizing to a data field comprising coarse head positioning information such as a track number (TKID 111), a servo wedge ID track including a servo wedge number to provide circumferential position data, and servo bursts 114 which provide fine head positioning information. During normal operation the servo bursts 114 are processed by the disk drive in order to maintain a head over a centerline of a target track while writing or reading data.

External servo writers are typically used to write the servo sectors 2 to the disk surface during manufacturing. External servo writers employ extremely accurate head positioning mechanics, such as a laser interferometer or optical encoder, to ensure the servo sectors are written at the proper radial location from the outer diameter of the disk to the inner diameter of the disk. However, external servo writers are expensive to operate, require a clean room environment, and are a very significant cost in the disk drive manufacturing process.

The prior art has suggested various self servo-writing methods wherein the internal electronics of the disk drive are used to write the servo sectors independent of an external servo writer to reduce the reliance on external servo writers. For example, U.S. Pat. No. 5,668,679 teaches a disk drive which performs a self-servo writing operation by writing a plurality of spiral reference patterns to the disk which are then processed to write the servo sectors along a circular path. The spiral patterns are written "open loop" by seeking the head from an outer diameter of the disk to an inner diameter of the disk. The disk drive calibrates acceleration/deceleration impulses to seek the head from the outer to inner diameter in a desired amount of time. Accurate radial positioning of the spiral patterns assumes the calibration process is accurate and that the calibrated acceleration/deceleration impulses will generate a repeatable response over multiple seeks.

However, the calibration process will inevitably exhibit some degree of error and the dynamics of the disk drive will change between seeks inducing errors in the radial position of the spiral reference patterns. Dynamic errors which degrade the spiral patterns written during an open loop seek include vibration of the HDA, flutter and non-repeatable run-out of the disk and spindle bearings, stiction and non-repeatable run-out of the pivot bearings, windage on the head and arm, and flex circuit bias, windage, vibration, and temperature. Errors in writing the spiral patterns will propagate to the servo sectors, thereby degrading the operating performance of the disk drive and reducing the manufacturing yield.

Other attempts have been made to utilize an external servo writer in writing spiral reference patterns to a disk and then utilizing the control circuitry of the disk drive itself to write the servo sectors based upon the previously written spiral patterns. In this combination, spiral patterns may be written with a higher degree of accuracy utilizing the external servo writer and thereafter servo sectors may be written utilizing the disk drive itself to minimize the cost and expense related to the use of an external servo writer.

Nonetheless, even with the use of an external servo writer to aid in writing spiral reference patterns to the disk, previously employed methods unfortunately require a relatively large amount of in order to write the spiral patterns and, further, due to the thermal expansion and/or contraction of the head disk assembly (HDA) along with other error sources there is still a relatively large amount of clock track drift introduced into the process, which results in errors in the written spiral reference patterns and consequently the written servo sectors to the disk.

For example, one previously employed method utilizes an external servo writer to write a single frequency reference track at the inner diameter (ID) of a disk and a single frequency reference track at the outer diameter (OD) of the disk. These reference tracks consist of a single frequency tone, one head width wide, bounded on both sides by bands of erased tracks to either side.

Under the control of the external servo writer, spiral reference patterns may be written. This method involves the external servo writer moving the actuator of the HDA toward the outer diameter, within the OD erase bands, to search for the OD reference track. While searching for the OD reference track, a track average amplitude (TAA) is read as the head of the actuator is incrementally stepped toward the OD reference track until the reference track signal is detected. Usually a threshold is counted to discriminate between the amplitude of an erase signal or the amplitude of a written reference track signal. The laser position of the external servo writer is then recorded. The actuator under the control of the external servo writer continues stepping until the TAA amplitude drops back below the threshold previously described and the laser position of the external servo writer is again recorded. The laser position is then averaged and this is regarded as the OD reference track center. The same process is employed for finding the reference track of the ID.

A spiral reference pattern may then be written between the OD reference track and the ID reference track. This process of finding the OD reference track and the ID reference track is employed every time a spiral reference pattern is to be written.

Unfortunately, this process takes a relatively large amount of time to find the OD and ID reference tracks in order to write the spiral pattern and still does not account for many of the variables associated with clock track drift, such as thermal expansion and/or contraction of the HDA, resulting in less accurate spiral patterns and consequently less accurate servo sectors subsequently written to the disk based on the spiral pattern.

SUMMARY

In one aspect, the invention may be regarded as a method for reducing spiral write time and clock reference drift while writing spiral reference patterns on a disk of a disk drive.

The disk drive comprises control circuitry and a head disk assembly (HDA) including the disk, an actuator arm, a head connected to a distal end of the actuator arm, and a voice coil motor for rotating the actuator arm about a pivot to position the head radially over the disk. The method includes controlling a radial location of the head for writing a first band of tracks near one of an outer diameter (OD) circumference of the disk or an inner diameter (ID) circumference of the disk and for writing a second band of tracks near the other of the OD circumference of the disk or the ID circumference of the disk, respectively, wherein a substantial majority of the tracks each include a plurality of servo sectors including a track number and a sync mark.

A first reference center position for a center track of the first band of tracks is determined and a second reference center position for a center track of the second band of tracks is determined. The head is moved to a first predicted position for the first reference center position. Next, the head is moved to a second predicted position for the second reference center position. The distance between the first and second reference center positions is measured. A spiral reference pattern is then written from the first reference center position towards the center track of the second band of tracks based upon the measured distance between the first and second reference center positions.

In one embodiment, the method further comprises calculating a first position correction based upon the distance between the first predicted position and the first reference center position; calculating a second position correction based upon the difference between the second predicted position and the second reference center position; determining a spiral slope correction for use in writing the spiral reference pattern based upon the first position correction and the second position correction and the measured distance between the first and second reference center positions; and writing the spiral reference pattern utilizing the spiral slope correction.

In one embodiment, calculating the first position correction includes reading a track number and a sync mark for the first predicted position. The first position correction may include both a radial correction value and a circumferential correction value. Also, the second position correction may include reading a track number and a sync mark for the second predicted position. Further, the second position correction may include both a radial correction value and a circumferential correction value.

In one embodiment, an external servo writer may be utilized with the disk drive in which the external servo writer inserts a head-positioning pin into HDA before writing the spiral reference patterns and in which the head positioning pin engages the actuator arm. Control circuitry of the disk drive may be used to process the spiral reference patterns in order to write servo sectors to the disk during a self-servo writing operation. Alternatively, the external servo writer may be used to process the spiral reference patterns in order to write servo sectors to the disk.

In one embodiment, when the external servo writer is utilized with the disk drive, the external servo writer may include an optical encoder to derive the radial location of the head. Alternatively, when the external servo writer is utilized with the disk drive, the external servo writer may include a laser interferometer to derive the radial location of the head.

In one embodiment, each spiral reference pattern may be written from the outer diameter band of tracks of the disk to the inner diameter bands of tracks of the disk. Alternatively, each spiral reference pattern may be written from the inner diameter band of tracks of the disk to the outer diameter band of tracks of the disk.

In one embodiment, the head internal to the disk drive is utilized to read the spiral reference patterns in order to write servo sectors to the disk. The servo sectors may be written in a substantially circular path.

In another aspect, the invention may be regarded as a system for reducing spiral write time and clock reference drift while writing spiral reference patterns on a disk. The system includes a disk drive including control circuitry and a head disk assembly (HDA) comprising the disk, an actuator arm, a head connected to a distal end of the actuator arm, and a voice coil motor for rotating the actuator arm about a pivot to position the head radially over the disk, and an external servo writer system.

The external servo writer system is used to: control a radial location of the head for writing a first band of tracks near one of the outer diameter (OD) circumference of the disk or an inner diameter (ID) circumference of the disk and for writing a second band of tracks near the other of the OD circumference of the disk or the ID circumference of the disk, respectively, wherein a substantial majority of the tracks each include a plurality of servo sectors including a track number and a sync mark; determine a first reference center position for a center track of the first band of tracks and a second reference center position for a center track of the second band of tracks; move the head to a predicted position for the first reference center position; move the head to a predicted position for the second reference center position; measure the distance between the first and second reference center positions; and write the spiral reference pattern from the first reference center position towards the center track of the second band of tracks based upon the measured distance between the first and second reference center positions.

The foregoing and other features are described in detail in the Detailed Description and are set forth in the appended claims.

DETAILED DESCRIPTION

Figure 2:
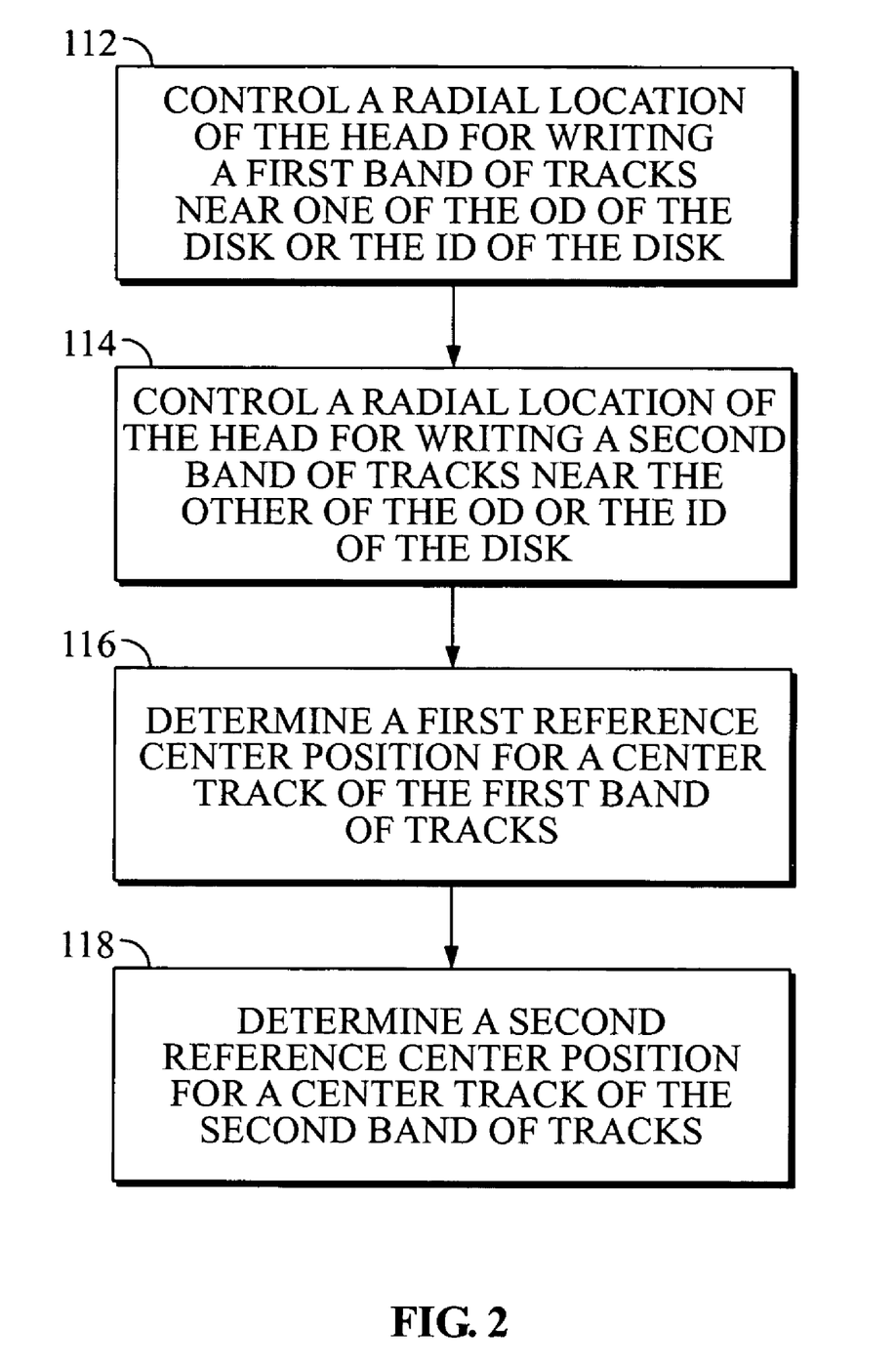
FIG. 2 is a flow chart illustrating a process to write a band of tracks near both the outer diameter (OD) circumference and the inner diameter (ID) circumference of the disk, according to one embodiment of the invention.
Figure 3:
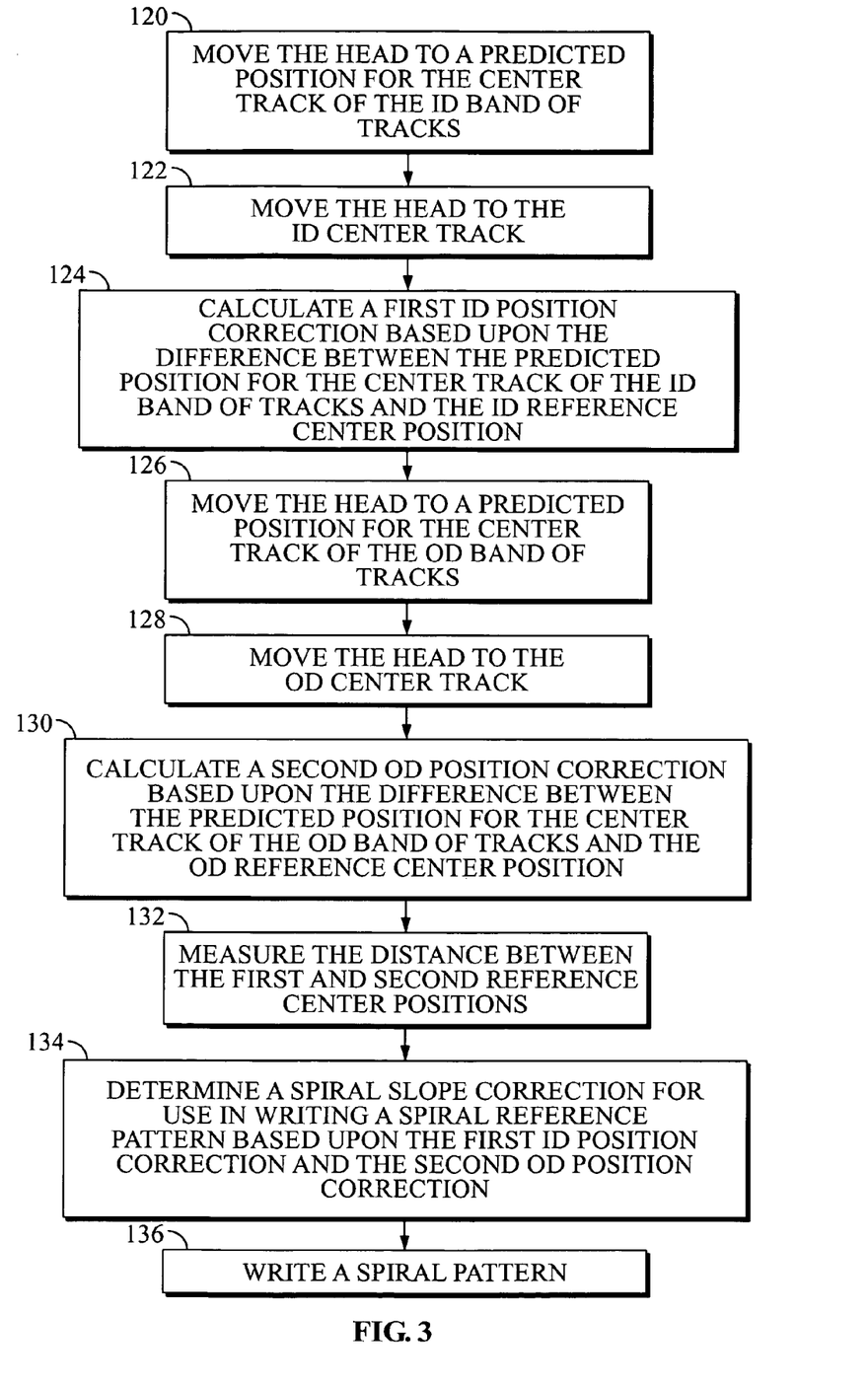
FIG. 3 is a flow chart illustrating a process to write spiral pattern between the OD and the ID band of tracks, according to one embodiment of the invention.
Figures 4A, 4B:
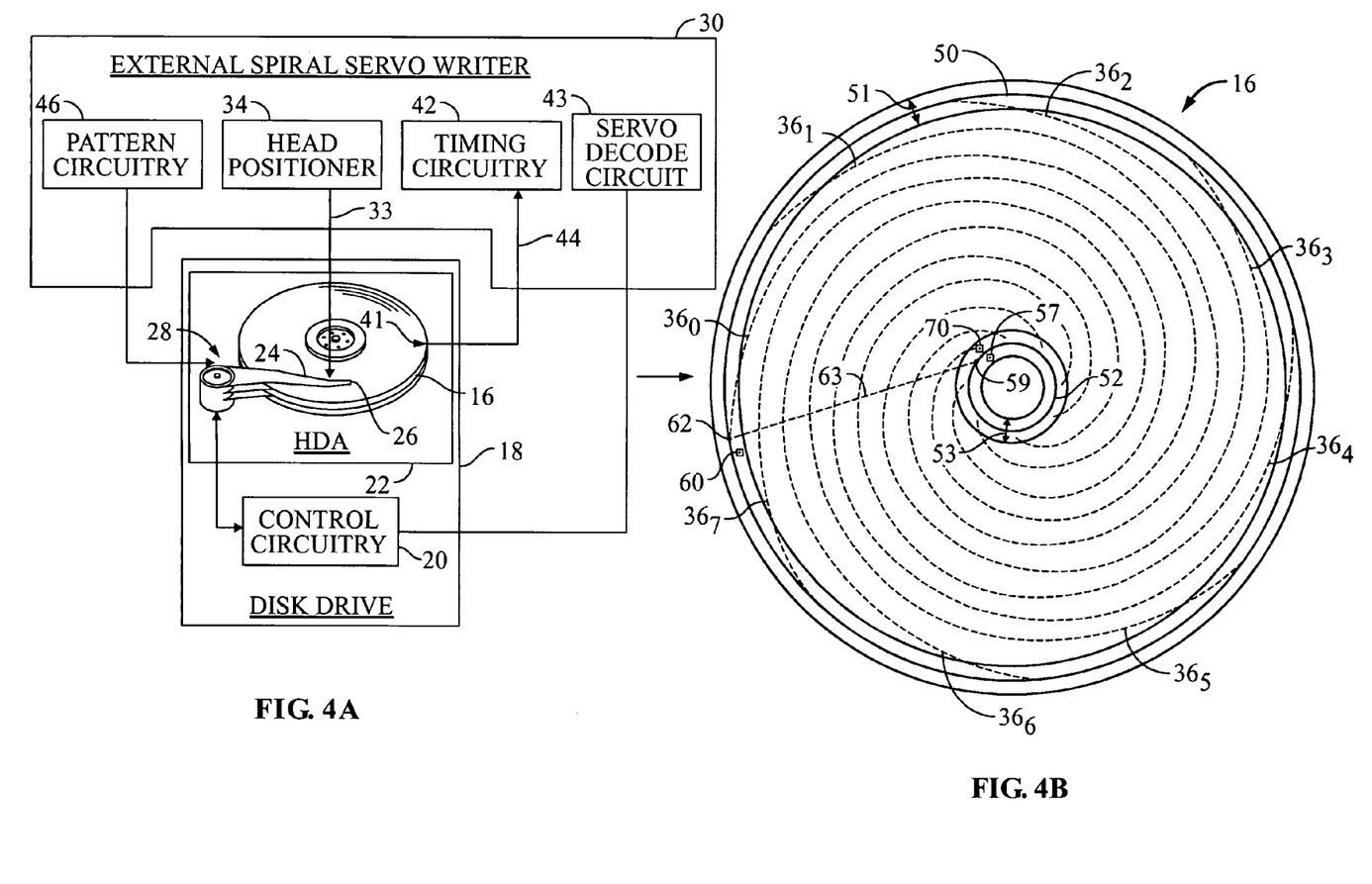
FIGS. 4A and 4B is a diagram illustrating an external spiral servo writer used to write a plurality of spiral reference patterns according to the processes of FIGS. 2 and 3, according to one embodiment of the invention.
Figure 4C:
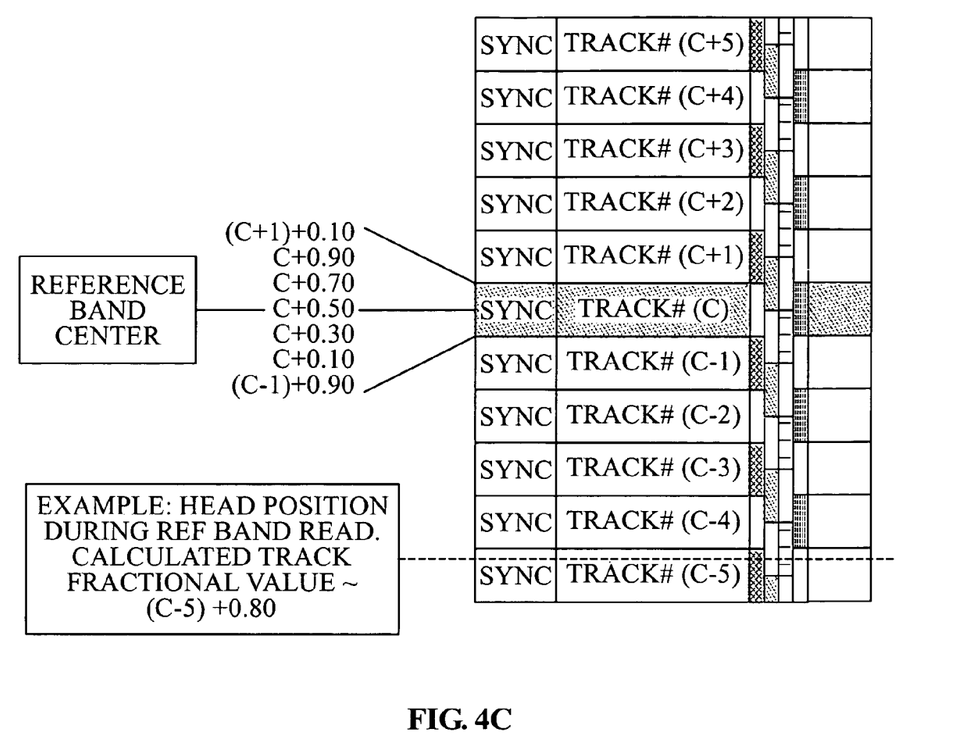
FIG. 4C is a simplified diagram illustrating an example of measuring radial displacement as part of a position correction value, according to one embodiment of the invention.
Figure 4D:
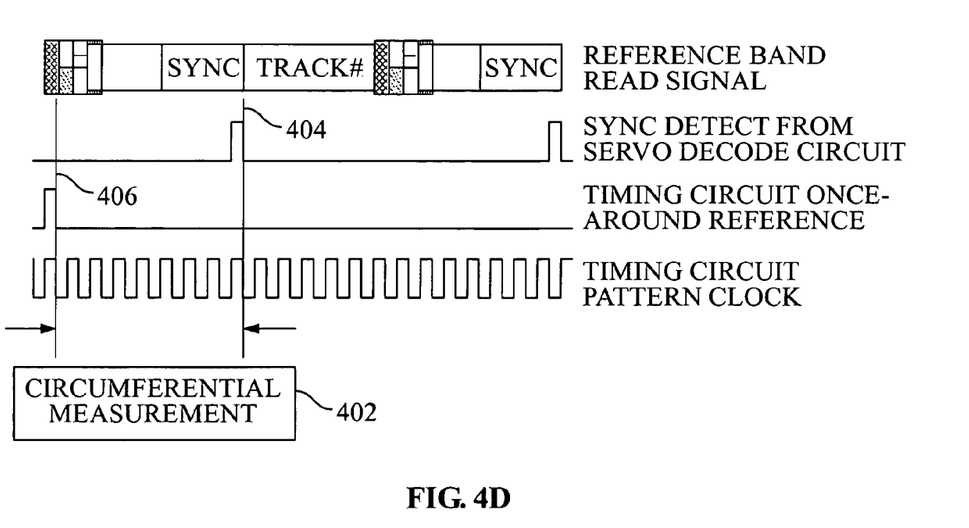
FIG. 4D is a simplified diagram illustrating an example of measuring circumferential displacement as part of a position correction value, according to one embodiment of the invention.

With reference to FIGS. 2–4, embodiments of the invention related to a method and system for reducing spiral write time and clock track drift while writing spiral reference patterns $36_0$–$36_7$ (FIG. 4B) to a disk 16 of a disk drive 18 are illustrated. The spiral reference patterns may be used as a reference for writing servo sectors, as will be discussed.

Turning briefly to FIG. 4A, the disk drive 18 comprises control circuitry 20 and a head disk assembly (HDA) 22. The HDA comprises the disk 16, an actuator arm 24, a head 26 connected to a distal end of the actuator arm 24, and a voice coil motor 28 for rotating the actuator arm 24 about a pivot to position the head 26 radially over the disk 16.

According to one embodiment of the invention, an external spiral servo writer 30 including a head positioner 34, timing circuitry 42, servo decode circuit 43, and pattern circuitry 46 may be used to aid in writing a plurality of spiral reference patterns $36_0$–$36_7$ between a center track 50 of a first band of tracks 51 written near an outer diameter (OD) circumference of the disk and a center track 52 of a second band of tracks 53 written near an inner diameter (ID) circumference of the disk.

Thermal expansion of the disk during the writing of the plurality of spiral reference patterns $36_0$–$36_7$ may increase a radial distance between the inner and outer center tracks 50 and 52 as well as introduce circumferential errors. Particularly, during the process of the writing of the spiral reference patterns $36_0$–$36_7$, a spindle motor (not shown) may generate heat that is conducted to the disk 16. The heat causes thermal expansion of the disk. This thermal expansion can be on the order of several data tracks so that, without adjustment, a last written spiral reference pattern may have a different slope from a first written spiral reference pattern causing an abrupt discontinuity that may interfere with circular track following desired for writing servo sectors. Embodiments of the invention provide for a method and system for reducing spiral write time and clock track drift while writing the spiral servo patterns to the disk.

In one embodiment, with reference also to FIG. 2, the external spiral servo writer 30 having a disk drive 18 coupled thereto may perform a process to control a radial location of a head 26 of the disk drive such that a first band of tracks 51, in this example, at the outer diameter (OD) circumference of the disk 16 are written (block 112). Further, a radial location of the head 26 is controlled by the external spiral servo writer 30 to write a second band of tracks 53, in this example, at the inner diameter (ID) circumference of the disk (block 114). A substantial majority of the tracks of the band of tracks each includes typical servo information, e.g., a plurality of servo sectors each including a preamble, a track number, a sync mark, a servo wedge ID, etc.

In order to implement the process, the external spiral servo writer 30 determines a first OD first reference center position 62 for the center track 50 of the first OD band of tracks 51 (block 116). Next, the external spiral servo writer 30 determines a second ID reference center position 59 for the center track 52 of the ID band of tracks 53 (block 118). Both the ID reference center position and OD reference center position are based upon the external spiral servo writer's own positioning and timing circuitry, for use as a reference, utilizing for example, an optical encoder or a laser interferometer.

For example, a head positioning pin 33 of the external spiral servo writer 30 may be inserted into the HDA 22 before writing the first OD band of tracks 51 and the second ID band of tracks 53 and before writing any spiral reference patterns $36_0$–$36_7$, as will be discussed, such that the head positioning pin engages the actuator arm 24. The external spiral servo writer comprises head positioning mechanics 34 used to derive a radial location and circumferential location of the head 26.

The head positioning pin 33 is actuated in response to the radial location of the head 26 in a closed loop system in order to position the head 26 radially over the disk 16 while writing a plurality of servo sectors to the disk in order to form the OD first band of tracks 51 and the ID second band of tracks 53, as well as, in one embodiment, servo bursts to write a plurality of spiral reference patterns $36_0$–$36_7$. Each spiral reference pattern $36_i$ may be written from the center track 50 of the first OD band of tracks 51 to the center track 52 of the ID band of tracks 53. Alternatively, the spiral reference patterns may be written from the ID to the OD in similar fashion. The head positioning mechanics 34 may include an optical encoder to derive the radial location and the circumferential location of the head upon encountering either the first OD reference center track 50 or the second ID reference track 52. Alternatively, a laser interferometer may be utilized for this purpose.

With particular reference to FIGS. 3 and 4, in order to write a spiral reference pattern, the external spiral servo writer 30 first moves the head to a first predicted position 57 for the center track 52 of the ID band of tracks 53 (block 120). The external spiral servo writer then moves the head to the ID center track 52 and calculates a first ID position correction based upon the difference between the predicted position 57 for the center track of the ID band of tracks and the actual ID reference center position 59 (block 124).

As the head is being moved from the predicted position 57 to the actual ID reference center position 59, a servo decode circuit 43 of the external spiral servo writer 30 collects track numbers and sync mark data from each servo sector of each track as the head is moved to the ID reference center position. As the servo wedges are read, the data in each servo sector is resolved into a track number with a fractional track value (based upon sync amplitudes). These collected tracks with fractional track values are averaged into a single track/fraction value.

Referring briefly to FIG. 4C, FIG. 4C illustrates an example of measuring radial displacement as part of the position correction value. Particularly, the first ID reference center position is calculated based upon the previously-described track-fraction value, the track pitch with which the reference track band was written, and the current position of the external spiral servo writer 30.

Using the example illustrated in FIG. 4C, for a track pitch of "P", a reference band center (C) of 25 and a current external position of N, the first reference track center position (X) in external positioner counts may be calculated as follows:

$C+0.5=25.5, (C-5)+0.8=20.8;$ $X=N+P(25.5-20.8)$

Further, circumferential position information may be gathered based on the location of the tracks of the first band of ID track sync marks versus timing information from the clock track/circumferential time reference (utilizing timing circuitry 42).

Looking briefly at FIG. 4D, FIG. 4D is a simplified diagram illustrating an example of measuring circumferential displacement as part of the position correction value. Timing information may be gathered based on timing information gathered immediately after the first center ID reference track is written to obtain an initial offset value and this initial offset value can be subsequently updated each time the first center ID reference track is sought to. To obtain an initial circumferential offset value a sync detect 404 from the servo decode circuit 43 is compared to the timing circuit once-around reference 406.

In this way, circumferential errors due to the expansion or contraction of the disk as well as clock-track reference drift, in addition to radial errors, may be accounted for.

The previously-described process is then utilized for the OD band of tracks 51. Again the head is moved to the predicted position 60 for the center track 50 of the OD band of tracks 51 (block 126) then the head is moved to the OD reference center track 50 (block 128). Then, a second OD position correction is calculated based upon the difference between the predicted position 60 for the center track 50 of the OD band of tracks and the actual OD reference center position 62. The previously-described process for calculating the position correction based on radial and circumferential components is utilized. Further, at block 132, the distance 63 is measured between the first and second reference center positions 62 and 59.

After searching to ID and OD center track positions and calculating ID and OD position corrections, both radially and circumferentially, as previously discussed, a spiral pattern may be written (block 136).

Particularly, a spiral reference pattern $36_0$ may be written from the OD reference center position 62 towards the center track 52 of the ID band of tracks to a predicted ID center position 70 based upon the measured distance 63 between the first and second reference center position and based upon a spiral slope correction.

The spiral slope correction is based upon the previously calculated first ID position correction and the second OD position correction (with both radial and circumferential correction components) and the measured distance 63 between the OD reference center position 62 and the ID reference center position 59. A spiral reference pattern (e.g. $36_0$) may be written utilizing the measured distance between the ID and OD reference center positions and based upon the spiral slope correction.

After each spiral reference pattern is written (e.g. $36_0$–$36_7$), the distance between the ID and the OD reference center positions are again measured, the circumferential measurement data is compared against the initial circumferential measurement data gathered when the respective center track of the reference band of tracks was established, and the spiral slope and/or clock timing are adjusted to correct for the differences in the two measurements. Similarly, the spiral radial position data from the predicted positions is compared against the base line reference center positions, as previously discussed to calculate position corrections, and is also used to adjust the spiral slope and length of the next spiral to be written (e.g. $36_0$–$36_7$). Thus, radial and circumferential position corrections are applied after writing each spiral reference pattern.

Accordingly, spiral reference patterns are easily calculated based upon four known inputs: the OD reference center track 50; the ID reference center track 52; a predicted OD spiral start position 60; and a predicted spiral ID position 57. As previously discussed, a predicted ID spiral end position 57 is sought to and an ID position correction value is calculated. Next, a predicted OD spiral start position 60 is sought to and a spiral start position correction is calculated. Based upon the spiral start and spiral end position correction values, both a new spiral length and a new spiral slope correction are determined and a new spiral (e.g. $36_1$–$36_7$, etc.) is written from the OD reference track position towards the ID reference track position 70 (e.g. a new predicted ID spiral end position) and this process is iteratively repeated to write a plurality of spiral reference patterns (e.g. $36_1$–$36_7$). Of course, this process is similarly implementable in reverse to write spiral reference patterns from the ID to the OD. It should be appreciated that previously described method steps 122 and 128 related to moving the head to the actual ID and OD center tracks may be optionally implemented after calibration.

The previously described system and method provides a significantly reduced write time for spiral reference patterns, as well as, increased accuracy by accounting for both radial and circumferential position errors.

Figure 5:
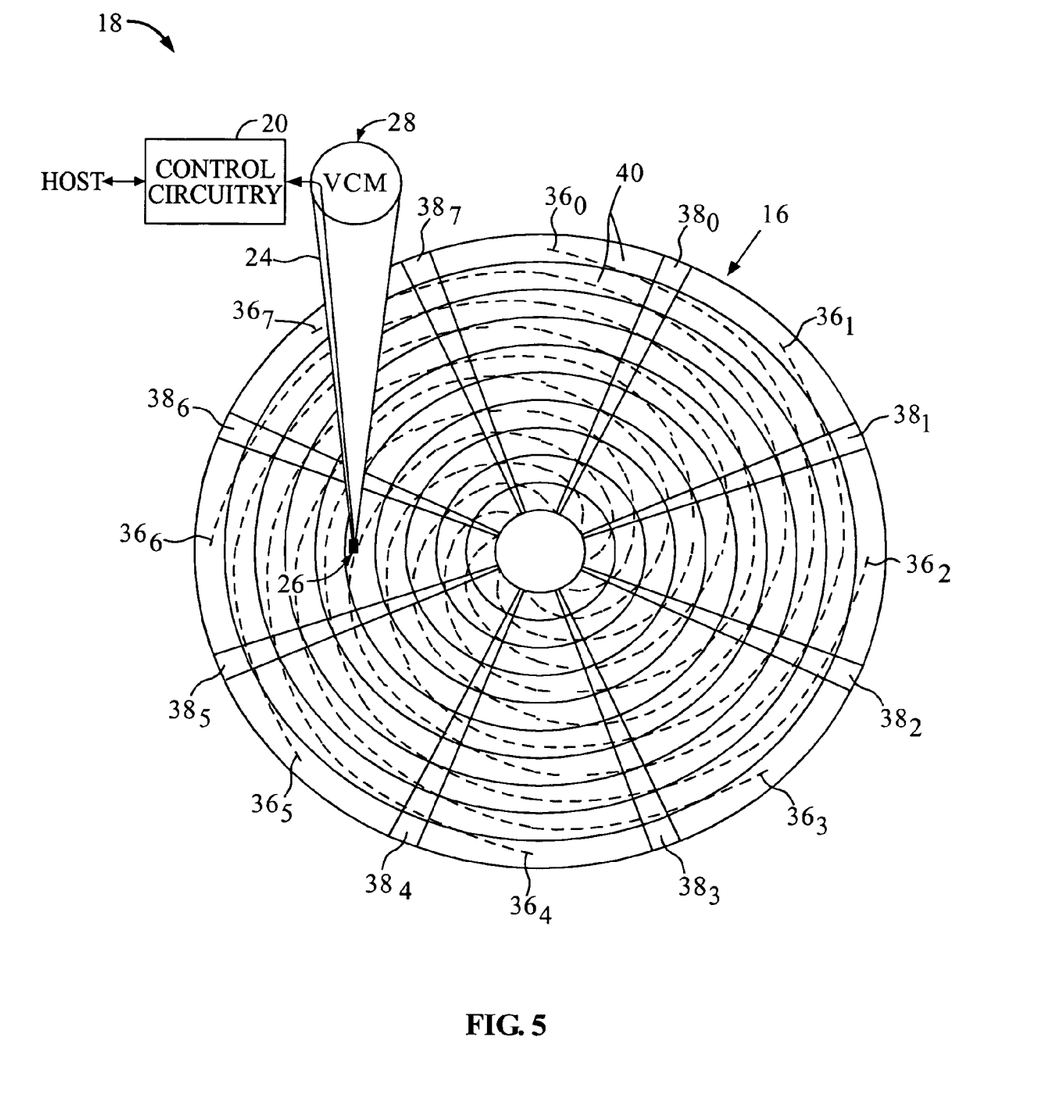
FIG. 5 shows a disk drive that processes the reference servo bursts in the spiral reference patterns to self-servo write servo sectors to the disk, according to one embodiment of the invention.

In one embodiment, after the spiral reference patterns $36_0$–$36_7$ are written to the disk 16, the head positioning pin 33 is removed from the HDA 22 and the head 26 internal to the disk drive 18 is used to read the reference servo bursts in the spiral reference patters $36_0$–$36_7$ in order to write the servo sectors $38_0$–$38_7$ to the disk 16, as shown in FIG. 5, thereby defining the plurality of radially spaced concentric data tracks 40.

As shown in FIG. 5, the control circuitry 20 of the disk drive 18 may be used to read the reference servo burst in the spiral reference patterns $36_0$–$36_7$ in order to write the servo bursts $38_0$–$38_7$ to the disk 16 during a self-servo writing operation.

Alternatively, with reference to FIG. 6, an external servo writer 50 may be used to read the reference servo bursts in the spiral reference patterns $36_0$–$36_7$ in order to write the servo burst $38_0$–$38_7$ to the disk 16, as will be discussed.

In, the embodiment of FIG. 4A, FIG. 4A shows the entire disk drive 18 inserted into an external spiral servo writer 30 while writing the spiral reference patterns $36_0$–$36_7$ to the disk 16. However, in another embodiment, only the HDA 22 may be inserted into the external spiral servo writer 30, wherein a printed circuit board assembly (PCBA) comprising the control circuitry 20 is mounted to the HDA after the external writer 30 writes the spiral reference patterns $36_0$–$36_7$ to the disk 16.

The head positioning pin 33 may be connected to the actuator arm 24 by applying a small amount of current to the voice coil motor 28 in order to bias the actuator arm 24 against the head positioning pin 33. In one embodiment, the head positioning mechanics 34 may include a laser interferometer for generating the radial location of the head 26. Alternatively, the head positioning mechanics may include an optical encoder. However, any suitable device for generating the radial location of the head 26 may be employed.

In the embodiment of FIG. 4A, the external servo writer 30 comprises a clock head 41 which is also inserted into the HDA 22 for reading a clock track recorded on an outer diameter of the disk 16. Timing circuitry 42 within the external servo writer 30 processes the signal 44 from the clock head 41 in order to write the reference servo bursts at the appropriate circumferential location. Pattern circuitry 46 within the external servo writer 30 generates the reference servo burst pattern applied to the head 26 at the appropriate time.

The number of spiral reference patterns $36_0$–$36_N$ as well as the slope of each spiral reference pattern $36_i$ may be selected so that the external spiral servo writer 30 can process the disk drive 18 in a significantly shorter time period as compared to writing a complete set of servo sectors $38_0$–$38_7$ to the disk 16. This increases the throughput of the external spiral servo writer 30 by having the disk drives self-servo write the servo sectors $38_0$–$38_7$ using the spiral reference patterns $36_0$–$36_7$ while avoiding errors inherent in having the disk drive write the spiral reference patterns $36_0$–$36_7$.

The servo sectors $38_0$–$38_N$ are written along a substantially circular path while tracking the spiral reference patterns $36_0$–$36_N$. The servo sectors $38_0$–$38_7$ form a plurality of servo wedges, which extend from servo sector to servo sector. The control circuitry 20 of FIG. 5 computes a position error for the head 26 with respect to a circular trajectory in response to the reference servo bursts. Because the reference servo bursts are similar in composition to the servo bursts (high frequency transitions recorded at a periodic interval) and because the reference servo bursts are substantially contiguous in the radial direction, a conventional servo algorithm may be employed to compute the head position error (e.g., an algorithm similar to that used to compute the head position error from the servo sectors $38_0$–$38_N$ during normal operation of the disk drive). The head position error is input to a servo control system, which generates the appropriate control signal applied to the voice coil motor 28. The algorithm for computing the head position error is continuously updated relative to the circumferential location of the head 26 to account for the spiral trajectory of the reference servo bursts in the spiral reference patterns $36_0$–$36_N$. In one embodiment, a timing clock is generated in response to the reference servo bursts, wherein the timing clock is used to write the servo sectors $38_0$–$38_N$ at the appropriate circumferential location on the disk 16. In another embodiment, the external spiral servo writer 30 writes a periodic clock signal together with the spiral reference patterns $36_0$–$36_N$, wherein the periodic clock signal is processed in order to generate the timing clock used to write the servo sectors $38_0$–$38_N$ at the appropriate circumferential location on the disk 16.

Figure 6:
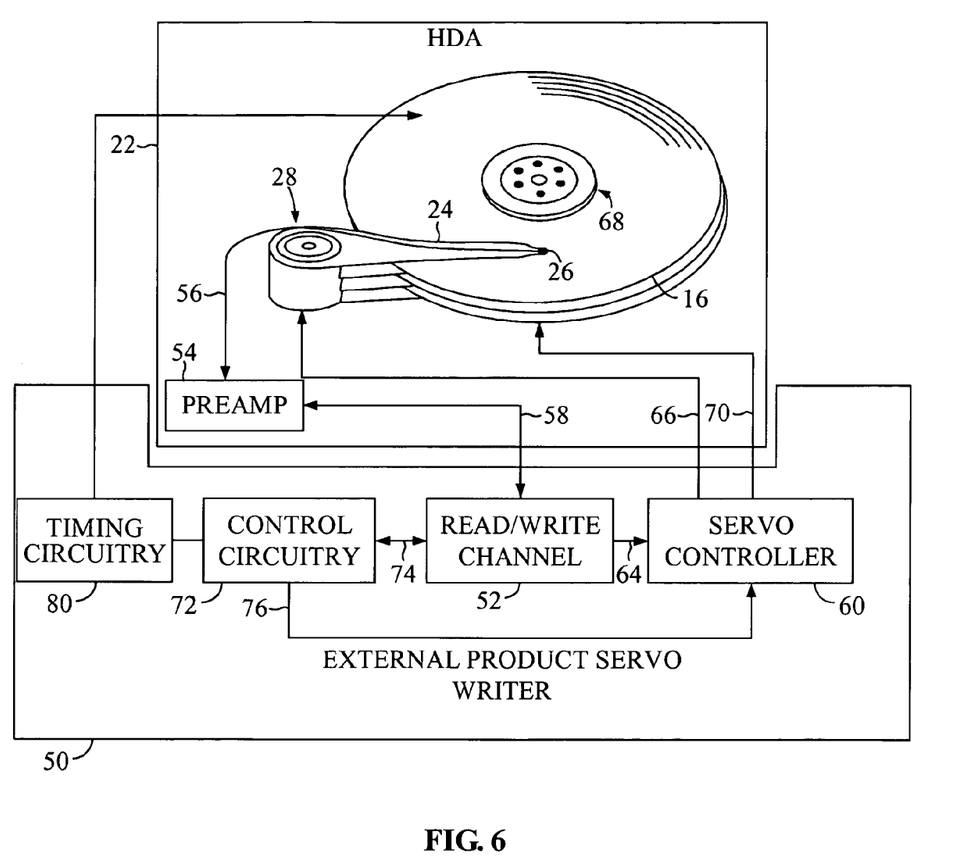
FIG. 6 shows an embodiment wherein an external servo writer is used to read the reference servo bursts in the spiral reference patterns in order to write the servo sectors to the disk.

FIG. 6 shows an embodiment of the present invention wherein after writing the spiral reference patterns $36_0$–$36_N$ to the disk 16, (FIGS. 4A–4B), the HDA 22 is inserted into an external servo writer 50 comprising suitable circuitry for reading and processing the spiral reference patterns $36_0$–$36_N$ in order to write the servo bursts $38_0$–$38_N$ to the disk 16. The external servo writer 50 comprises a read/write channel 52 for interfacing with a preamp 54 in the HDA 22. The preamp 54 amplifies a read signal emanating from the head 26 over line 56 to generate an amplified read signal applied to the read/write channel 52 over line 58. The read/write channel 52 comprises suitable circuitry/software for measuring the reference servo bursts (e.g., integration circuitry/software) and for transmitting a signal representing the reference servo bursts to a servo controller 60 over line 64. The servo controller 60 processes the reference servo burst signals to generate a head position error.

The head position error is used to generate a VCM control signal applied to the VCM 28 over line 66 in order to maintain the head 26 along a circular trajectory. The servo controller 60 also generates a spindle motor control signal applied to a spindle motor 68 over line 70 to maintain the disk 16 at a desired angular velocity. Control circuitry 72 processes information received from the read/write channel 52 over line 74 associated with the reference servo bursts (e.g., timing information) and provides the servo burst patterns to the read/write channel 52 at the appropriate time. The servo bursts patterns are provided to the preamp 54, which modulates a current in the head 26 in order to write the servo to the disk 16. The control circuitry 72 also transmits control information over line 76 to the servo controller 60, such as the target servo track to be written. After writing the servo bursts $38_0$–$38_N$ to the disk 16, the HDA 22 is removed from the external servo writer 50 and a printed circuit board assembly (PCBA) comprising the control circuitry 20 (FIG. 3A) is mounted to the HDA 22.

Figure 7:
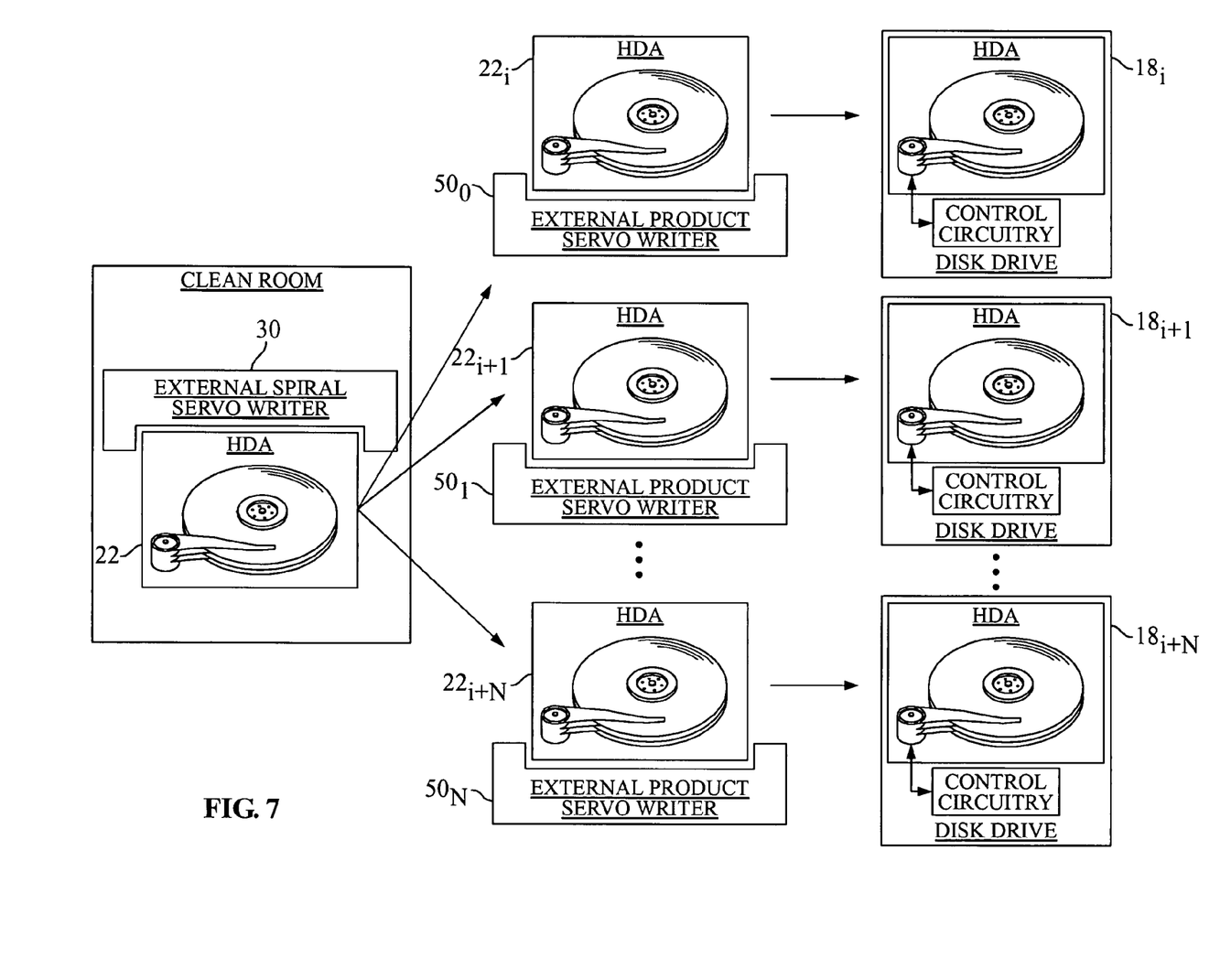
FIG. 7 shows an embodiment wherein a plurality of external servo writer's process the HDAs output by an external spiral servo writer.

In one embodiment, the external servo writer 50 of FIG. 7 interfaces with the HDA 22 over the same connections as the control circuitry 20 to minimize the modifications needed to facilitate the external servo writer 50. The external servo writer 50 is less expensive than a conventional servo writer because it does not require a clean room or sophisticated head positioning mechanics. In an embodiment shown in FIG. 7, a plurality of external servo writers $50_0$–$50_N$ process the HDAs $22_{i-i+N}$ output by an external spiral servo writer 30 in order to write the servo sectors less expensively and more efficiently than a conventional servo writer.

Although embodiments of the invention have been described with reference to various types of external servo writing equipment, it should be appreciated by those of skill in the art that the previously-described methods may be utilized with any type of positioning and servo writing types of equipment for use with a disk drive.

What is claimed is:

1. A method for reducing spiral write time and clock reference drift while writing spiral reference patterns on a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the method comprising:

controlling a radial location of the head for writing a first band of tracks near one of an outer diameter (OD) circumference of the disk or an inner diameter (ID) circumference of the disk and for writing a second band of tracks near the other of the OD circumference of the disk or the ID circumference of the disk, respectively, a substantial majority of the tracks each including a plurality of servo sectors including a track number and a sync mark;

determining a first reference center position for a center track of the first band of tracks and a second reference center position for a center track of the second band of tracks;

moving the head to a first predicted position for the first reference center position;

moving the head to a second predicted position for the second reference center position;

measuring the distance between the first and second reference center positions; and writing the spiral reference pattern from the first reference center position towards the center track of the second band of tracks based upon the measured distance between the first and second reference center positions.

2. The method of claim 1, further comprising:
 calculating a first position correction based upon the difference between the first predicted position and the first reference center position;
 calculating a second position correction based upon the difference between the second predicted position and the second reference center position;
 determining a spiral slope correction for use in writing the spiral reference pattern based upon the first position correction and the second position correction and the measured distance between the first and second reference center positions; and
 writing the spiral reference pattern utilizing the spiral slope correction.

3. The method of claim 2, wherein calculating the first position correction further comprises reading a track number and sync mark for the first predicted position.

4. The method of claim 3, wherein the first position correction includes both a radial correction value and a circumferential correction value.

5. The method of claim 2, wherein calculating the second position correction further comprises reading a track number and a sync mark for the second predicted position.

6. The method of claim 5, wherein the second position correction includes both a radial correction value and a circumferential correction value.

7. The method of claim 1, wherein an external servo writer is utilized with the disk drive, the external servo writer to insert a head-positioning pin into the HDA before writing the spiral reference patterns, the head positioning pin for engaging the actuator arm.

8. The method of claim 1, wherein the control circuitry of the disk drive is used to process the spiral reference patterns in order to write servo sectors to the disk during a self-servo writing operation.

9. The method of claim 1, wherein an external servo writer is used to process the spiral reference patterns in order to write servo sectors to the disk.

10. The method of claim 1, wherein an external servo writer is utilized with the disk drive, the external servo writer including an optical encoder to derive the radial location of the head.

11. The method of claim 1, wherein an external servo writer is utilized with the disk drive, the external servo writer including a laser interferometer to derive the radial location of the head.

12. The method of claim 1, wherein each spiral reference pattern is written from the outer diameter band of tracks of the disk to the inner diameter band of tracks of the disk.

13. The method of claim 1, wherein each spiral reference pattern is written from the inner diameter band of tracks of the disk to the outer diameter band of tracks of the disk.

14. The method of claim 1, further comprising using the head internal to the disk drive to read the spiral reference patterns in order to write servo sectors to the disk.

15. The method of claim 14, wherein the servo sectors are written in a substantially circular path.

16. A system for reducing spiral write time and clock reference drift while writing spiral reference patterns on a disk, the system comprising:
 a disk drive including:
  control circuitry; and
  a head disk assembly (HDA) comprising the disk, an actuator arm, a head connected to a distal end of the actuator arm, and a voice coil motor for rotating the actuator arm about a pivot to position the head radially over the disk; and
 an external servo writer system to:
  control a radial location of the head for writing a first band of tracks near one of an outer diameter (OD) circumference of the disk or an inner diameter (ID) circumference of the disk and for writing a second band of tracks near the other of the OD circumference of the disk or the ID circumference of the disk, respectively, a substantial majority of the tracks each including a plurality of servo sectors including a track number and a sync mark;
  determine a first reference center position for a center track of the first band of tracks and a second reference center position for a center track of the second band of tracks;
  move the head to a first predicted position for the first reference center position;
  move the head to a second predicted position for the second reference center position;
  measure the distance between the first and second reference center positions; and
  write the spiral reference pattern from the first reference center position towards the center track of the second band of tracks based upon the measured distance between the first and second reference center positions.

17. The system of claim 16, wherein the external servo writer system further:
 calculates a first position correction based upon the difference between the first predicted position and the first reference center position;
 calculates a second position correction based upon the difference between the second predicted position and the second reference center position;
 determines a spiral slope correction for use in writing the spiral reference pattern based upon the first position correction and the second position correction and the measured distance between the first and second reference center positions; and
 writes the spiral reference pattern utilizing the spiral slope correction.

18. The system of claim 17, wherein calculating the first position correction further comprises reading a track number and a sync mark for the first predicted position.

19. The system of claim 18, wherein the first position correction includes both a radial correction value and a circumferential correction value.

20. The system of claim 17, wherein calculating the second position correction further comprises reading a track number and a sync mark for the second predicted position.

21. The system of claim 20, wherein the second position correction includes both a radial correction value and a circumferential correction value.

22. The system of claim 16, wherein the external servo writer inserts a head-positioning pin into the HDA before writing the spiral reference patterns, the head positioning pin for engaging the actuator arm.

23. The system of claim 16, wherein the control circuitry of the disk drive is used to process the spiral reference patterns in order to write servo sectors to the disk during a self-servo writing operation.

24. The system of claim 16, wherein an external servo writer is used to process the spiral reference patterns in order to write servo sectors to the disk.

25. The system of claim 16, wherein the external servo writer includes an optical encoder to derive the radial location of the head.

26. The system of claim 16, wherein the external servo writer includes a laser interferometer to derive the radial location of the head.

27. The system of claim 16, wherein each spiral reference pattern is written from the outer diameter band of tracks of the disk to the inner diameter band of tracks of the disk.

28. The system of claim 16, wherein each spiral reference pattern is written from the inner diameter band of tracks of the disk to the outer diameter band of tracks of the disk.

29. The system of claim 16, wherein the head of the disk drive is used to read the spiral reference patterns in order to write servo sectors to the disk.

30. The system of claim 29, wherein the servo sectors are written in a substantially circular path.

* * * * *